(12) United States Patent
Wang et al.

(10) Patent No.: US 7,835,372 B2
(45) Date of Patent: Nov. 16, 2010

(54) SYSTEM AND METHOD FOR TRANSPARENT WIRELESS BRIDGING OF COMMUNICATION CHANNEL SEGMENTS

(76) Inventors: Weilin Wang, 12766 Searbreeze Farm Dr., San Diego, CA (US) 92130; John Edler, 2419 265th St., Marshalltown, IA (US) 50158; Michael Nova, 6725 Rancho Toyon Pl., Del Mar Mesa, CA (US) 92130; James Rimmer, 7859 Camino Glorita, San Diego, CA (US) 92122; Max Okumoto, 7876 Camino Glorita, San Diego, CA (US) 92122; Siddartha Gundeti, 7693 Palmilla Dr., San Diego, CA (US) 92122

(*) Notice: Subject to any disclaimer, the term of this patent is extended or adjusted under 35 U.S.C. 154(b) by 559 days.

(21) Appl. No.: 11/421,998

(22) Filed: Jun. 2, 2006

(65) Prior Publication Data
US 2006/0274745 A1    Dec. 7, 2006

Related U.S. Application Data

(63) Continuation-in-part of application No. 11/095,349, filed on Mar. 31, 2005, now abandoned, and a continuation-in-part of application No. 10/437,128, filed on May 13, 2003, and a continuation-in-part of application No. 10/437,129, filed on May 13, 2003, and a continuation-in-part of application No. 10/816,481, filed on Mar. 31, 2004.

(60) Provisional application No. 60/557,954, filed on Mar. 31, 2004, provisional application No. 60/380,425, filed on May 13, 2002.

(51) Int. Cl.
*H04L 12/28* (2006.01)

(52) U.S. Cl. ............ 370/401; 370/338; 370/351; 370/402; 370/408; 709/238; 709/249

(58) Field of Classification Search ............ 370/351, 370/401, 402, 408, 825.02
See application file for complete search history.

(56) References Cited

U.S. PATENT DOCUMENTS 5,309,437 A * 5/1994 Perlman et al. ............ 370/401

(Continued)

FOREIGN PATENT DOCUMENTS

WO    2007/143554    12/2007

*Primary Examiner*—Nick Corsaro
*Assistant Examiner*—Amanuel Lebassi
(74) *Attorney, Agent, or Firm*—McDonnell Boehnen Hulbert & Berghoff LLP (57) ABSTRACT

Systems and methods for transparent wireless bridging of communication channels are provided. A plurality of wireless bridge devices are each deployed on a wired communication channel segment and listen for traffic to build a table of MAC addresses for the network devices on each respective segment. The bridges also collectively form a wireless mesh network and publish the MAC addresses on the wireless mesh network so each bridge receives MAC address information for every segment. Accordingly, a sending device on a first segment sends a communication to a target device on a second segment. The respective first bridge passes the communication along through the wireless mesh network to the respective second bridge and the first bridge also sends an acknowledgement to the sending device on behalf of the target device. This proxy acknowledgement allows the wireless bridge system to account for potential latency over the wireless mesh network while at the same time complying with latency requirements and meeting or exceeding the overall round-trip time for network communications.

24 Claims, 7 Drawing Sheets

U.S. PATENT DOCUMENTS

| | | | |
|---|---|---|---|
| 5,844,905 | A | 12/1998 | McKay et al. |
| 5,943,322 | A | 8/1999 | Mayor et al. |
| 5,959,999 | A | 9/1999 | An |
| 6,003,007 | A | 12/1999 | DiRienzo |
| 6,023,563 | A * | 2/2000 | Shani .................. 709/249 |
| 6,076,066 | A | 6/2000 | DiRienzo |
| 6,161,104 | A | 12/2000 | Stakutis et al. |
| 6,173,387 | B1 | 1/2001 | Baxter et al. |
| 6,199,115 | B1 | 3/2001 | DiRienzo |
| 6,226,642 | B1 | 5/2001 | Beranek et al. |
| 6,272,492 | B1 | 8/2001 | Kay |
| 6,282,513 | B1 | 8/2001 | Strawder |
| 6,289,316 | B1 | 9/2001 | Aghili et al. |
| 6,292,596 | B1 | 9/2001 | Snyder et al. |
| 6,330,244 | B1 * | 12/2001 | Swartz et al. ............. 370/401 |
| 6,331,762 | B1 | 12/2001 | Bertness |
| 6,336,114 | B1 | 1/2002 | Garrison |
| 6,338,093 | B1 | 1/2002 | DiRienzo |
| 6,343,310 | B1 | 1/2002 | DiRienzo |
| 6,345,260 | B1 | 2/2002 | Cummings, Jr. et al. |
| 6,349,334 | B1 | 2/2002 | Faupel et al. |
| 6,356,992 | B1 | 3/2002 | Baxter et al. |
| 6,357,010 | B1 | 3/2002 | Viets et al. |
| 6,366,683 | B1 | 4/2002 | Langlotz |
| 6,366,912 | B1 | 4/2002 | Wallent et al. |
| 6,366,929 | B1 | 4/2002 | Dartigues et al. |
| 6,385,730 | B2 | 5/2002 | Garrison |
| 6,418,549 | B1 | 7/2002 | Ramchandran et al. |
| 6,434,191 | B1 | 8/2002 | Agrawal et al. |
| 6,460,128 | B1 | 10/2002 | Baxter et al. |
| 6,480,497 | B1 | 11/2002 | Flammer, III et al. |
| 6,640,087 | B2 | 10/2003 | Reed et al. |
| 6,671,840 | B1 | 12/2003 | Nagoya et al. |
| 6,687,259 | B2 | 2/2004 | Alapuranen |
| 6,694,313 | B1 | 2/2004 | Roemer |
| 6,754,188 | B1 | 6/2004 | Garahi et al. |
| 6,763,013 | B2 | 7/2004 | Kennedy |
| 6,791,949 | B1 | 9/2004 | Ryu et al. |
| 6,807,165 | B2 | 10/2004 | Belcea |
| 6,839,541 | B2 | 1/2005 | Alzoubi et al. |
| 6,845,084 | B2 | 1/2005 | Rangnekar et al. |
| 6,850,502 | B1 | 2/2005 | Kagan et al. |
| 6,850,511 | B2 | 2/2005 | Kats et al. |
| 6,853,641 | B2 | 2/2005 | Lindhorst-Ko et al. |
| 6,865,371 | B2 | 3/2005 | Salonidis et al. |
| 6,868,072 | B1 | 3/2005 | Lin et al. |
| 6,870,846 | B2 | 3/2005 | Cain |
| 6,879,570 | B1 | 4/2005 | Choi |
| 6,894,985 | B2 | 5/2005 | Billhartz |
| 6,904,021 | B2 | 6/2005 | Belcea |
| 6,907,257 | B1 | 6/2005 | Mizutani et al. |
| 6,909,721 | B2 | 6/2005 | Ekberg et al. |
| 6,948,048 | B2 | 9/2005 | Baxter et al. |
| 6,961,310 | B2 | 11/2005 | Cain |
| 6,965,575 | B2 | 11/2005 | Srikrishna et al. |
| 6,970,714 | B2 | 11/2005 | D'Souza et al. |
| 6,975,613 | B1 | 12/2005 | Johansson |
| 6,975,614 | B2 | 12/2005 | Kennedy |
| 6,980,524 | B1 | 12/2005 | Lu et al. |
| 6,985,476 | B1 | 1/2006 | Elliott et al. |
| 6,986,161 | B2 | 1/2006 | Billhartz |
| 7,002,944 | B2 | 2/2006 | Kats et al. |
| 7,003,313 | B2 | 2/2006 | Garces et al. |
| 7,007,102 | B2 | 2/2006 | Billhartz et al. |
| 7,016,328 | B2 | 3/2006 | Chari et al. |
| 7,027,426 | B2 | 4/2006 | Billhartz |
| 7,031,293 | B1 | 4/2006 | Srikrishna et al. |
| 7,035,207 | B2 | 4/2006 | Winter et al. |
| 7,046,639 | B2 | 5/2006 | Garcia-Luna-Aceves et al. |
| 7,050,806 | B2 | 5/2006 | Garces et al. |
| 7,050,819 | B2 | 5/2006 | Schwengler et al. |
| 7,053,770 | B2 | 5/2006 | Ratiu et al. |
| 7,054,126 | B2 | 5/2006 | Strutt et al. |
| 7,089,066 | B2 | 8/2006 | Hesse et al. |
| 7,280,555 | B2 | 10/2007 | Stanforth et al. |
| 2003/0126291 | A1 | 7/2003 | Wang et al. |
| 2003/0212821 | A1 * | 11/2003 | Gillies et al. ............ 709/238 |
| 2004/0229566 | A1 | 11/2004 | Wang et al. |
| 2005/0201340 | A1 | 9/2005 | Wang et al. |
| 2005/0201346 | A1 | 9/2005 | Wang et al. |
| 2007/0258508 | A1 * | 11/2007 | Werb et al. ............... 375/140 |

* cited by examiner

SYSTEM AND METHOD FOR TRANSPARENT WIRELESS BRIDGING OF COMMUNICATION CHANNEL SEGMENTS

RELATED APPLICATION

The present application is a continuation-in-part of co-pending U.S. patent application Ser. No. 11/095,349, filed on Mar. 31, 2005, which claims the benefit of U.S. provisional patent application Ser. No. 60/557,954 filed on Mar. 31, 2004; and is further a continuation-in-part of U.S. patent application Ser. No. 10/437,128 filed May 13, 2003 and 10/437,129 filed May 13, 2003, which both claim priority to 60/380,425, filed May 13, 2002; and is further a continuation-in-part of U.S. patent application Ser. No. 10/816,481, filed Mar. 31, 2004 which is a continuation-in-part of 10/437,128 and 10/437,129, each of which is incorporated herein by reference in its entirety.

BACKGROUND

1. Field of the Invention

The present invention is generally related to wired and wireless networking and is more specifically related to transparent bridging of communication channel segments.

2. Related Art

A wireless network is typically an unreliable medium for packet data communication. This is generally true because packet loss rates and latency are higher in wireless networks compared to wired networks with equivalent bandwidth. However, significant cost savings can be achieved by implementing wireless networks rather than wired networks. One such sector where significant savings can be achieved is in the building automation control network ("BACnet") field, using building automation protocols such as BACnet, Lonworks, ARCnet, RS485, RS232 or any other building automation protocol.

Unfortunately, wireless networks are poor solutions for building automation/BACnet implementations because building automation/BACnet requires reliable packet delivery at low latencies. For example, BACnet master-slave-token-passing ("MSTP") requires reliable packet delivery. This reliability is divided into a certain amount of time for the device to respond (Tusage_delay) and a certain amount of time to transmit the data (Tusage_delay+Tusage_timeout). In BACnet/MSTP, the network transmission time can be no worse than 5 ms. Therefore, conventional wireless communication networking technologies are unsuited for BACnet applications and what is needed is a system and method that overcomes the significant problems described above.

SUMMARY

Accordingly, systems and methods are presented that allow for transparent wireless bridging of communication channel segments on a network such as BACnet/MSTP or BACnet/IP. The solutions described herein provide for the required reliable packet delivery where necessary and meet the packet latency expectations described by the BACnet protocol.

One embodiment of the invention includes a plurality of wireless bridge devices that are each deployed on a segment (or are directly connected to a particular network device). The bridges listen for traffic on their respective segments and build a table of media access control ("MAC") addresses of the BACnet/MSTP or BACnet/IP network devices on their respective segment. The bridges also collectively form a wireless point-to-point, peer-to-peer or mesh network. After collecting the MAC address information, the bridges publish the MAC addresses on the wireless network and in turn receive MAC address information about the network devices on other segments. The MAC address propagation can take place on a control channel of the wireless point-to-point, peer-to-peer or mesh network. Each bridge then maintains a table of MAC address and the corresponding IP address of the bridge through which each network device can be reached.

During operation, when a device on a first segment sends a communication to a device on a second segment, the first bridge passes the communication along through the wireless network and also sends an acknowledgment to the sending device on behalf of the target device. This proxy acknowledgment allows the network communications to account for potential latency over the wireless network while at the same time complying with the latency requirements of the underlying communication protocol. The proxy message can be implemented for any communication, including poll for master ("PFM") communications, confirmed requests and token passing messages.

By implementing the proxy messaging scheme, the wireless bridge allows multiple segments to be transparently linked while maintaining the reliability and latency requirements of the protocol. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for transparent wireless bridging of network or serial communication segments using any radio platform such as 802.11, 802.15, 802.16, WiFi, ZigBee, ultra wide band ("UWB"), WiMAX, WAN radios, Bluetooth, and the like. For example, one method as disclosed herein allows for a wireless enabled bridge apparatus to monitor traffic on a segment and pass remotely destined packets from a sending network device over a wireless mesh network for delivery to the target network device on a different segment. The bridge additionally sends a proxy acknowledgment message to the sending device in order to maintain compliance with the latency requirements for the native communication protocol.

After reading this description it will become apparent to one skilled in the art how to implement the invention in various alternative embodiments and alternative applications. For example, the systems and methods can be implemented in both wired and wireless networks and bridge both wired segments and wireless segments implemented via direct communication links (e.g., serial connection, Bluetooth connection). However, although various embodiments of the present invention will be described herein, with the primary example being a wireless mesh bridge, it is understood that these embodiments are presented by way of example only, and not limitation. As such, this detailed description of various alternative embodiments should not be construed to limit the scope or breadth of the present invention as set forth in the appended claims.

Figure 1:
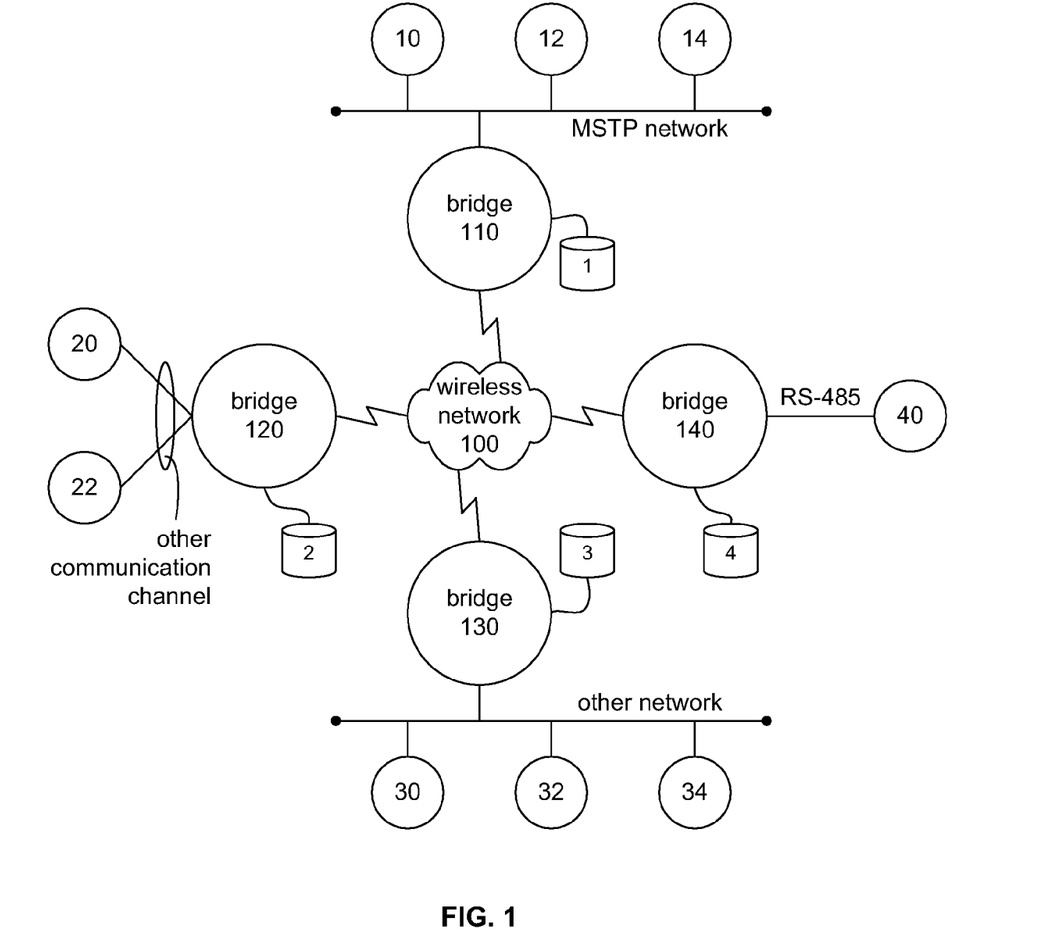
FIG. 1 is a network diagram illustrating an example system for wireless bridging of communication channels according to an embodiment of the present invention.

FIG. 1 is a network diagram illustrating an example system for wireless bridging of communication channels according to an embodiment of the present invention. In the illustrated embodiment, the system comprises four bridge devices, namely 110, 120, 130, and 140. Each bridge has a data storage area, respectively 1, 2, 3, and 4. The bridges are each communicatively coupled with one or more network devices 10, 12, 14, 20, 22, 30, 32, 34, and 40 via a network or direct communication channels. For example, bridge 110 is connected to network devices 10, 12, and 14 via a BACnet/MSTP network and bridge 130 is connected to network devices 30, 32, and 34 via another type of network, for example BACnet/IP. Additionally, bridge 140 is connected to network device 40 via a direct serial communication link conforming to the RS-485 protocol, and bridge 120 is connected to network devices 20 and 22 via another type of direct communication link, for example Bluetooth.

In the illustrated embodiment, bridge device 110, which is representative of the other bridge devices 120, 130, and 140, can be any type of processor driven device capable of communicating with a network device such as network device 10 over a communication channel and capable of communication with another bridge device over wireless network 100. The bridge device 110 can be configured for wired or wireless communication, or both. It can have a single or multiple radios to enable this communication. The bridge device 110 is configured to facilitate communications by receiving communications from the communication channel or wireless network 100 and providing those communications to the target network device on the local communication channel or on a remote communication channel via the wireless network 100. The bridge device 110 may support one or more communication protocols, including but not limited to: BACnet/IP, BACnet/Ethernet, BACnet/ARCnet, BACnet/MSTP, BACnet/PTP, and BACnet/Arcnet, just to name a few. Examples of a general purpose wireless communication device and a general purpose computer device that could be used as a bridge device are described later with respect to FIGS. 12 and 13.

In the illustrated embodiment, network device 10, which is representative of the other network devices 12, 14, 20, 22, 30, 32, 34, and 40 can be any type of processor driven device capable of communicating with other network devices and a bridge device over a communication channel. In various embodiments, the network devices can be computer workstations, field controllers, HVAC devices, thermostats, RFID readers, sensors, cameras, laptops, cell phones, personal digital assistants ("PDA"), gaming consoles, or any other network infrastructure devices. The network devices are configured to communicate over a BACnet/MSTP network or any other single-drop or multi-drop serial communication channel. Examples of a general purpose wireless communication device and a general purpose computer device that could be used as a network device are described later with respect to FIGS. 12 and 13.

In the illustrated embodiment, the wireless network 100 is a wireless mesh network communicatively coupling bridge devices 110, 120, 130, and 140. Additional devices may also be part of the wireless network 100. In alternative embodiments, the wireless network 100 can be any sort of 802.X wireless network. Advantageously, a wireless mesh network is very efficient for bridging communications between the various communication channels and can minimize network delays in communications.

In the illustrated embodiment, the various communication channels can be direct links or networks and can include BACnet/MSTP, raw RS-485, BACnet/PTP, raw RS-232, Bluetooth, infrared, and others such as BACnet/IP, BACnet/Ethernet, BACnet/ARCnet, and BACnet/Arcnet. A communication channel can be wired or wireless and serves to communicatively connect the various devices on the communication channel with each other and also with a bridge device.

"Although multiple segments or trunks are shown in FIG. 1 it should be understood that the wireless bridge 110 serves to function as a bridge between multiple segments running like protocols. For example, multiple MSTP segments can be bridged into a single network and multiple IP segments can be bridged into a single network. Importantly, it should also be understood that the wireless bridge 110 can bridge multiple MSTP segments and multiple IP segments at the same time. Accordingly, the wireless bridge 110 can be configured as shown whereby individual bridges are connected to segments of various types."

Figure 2:
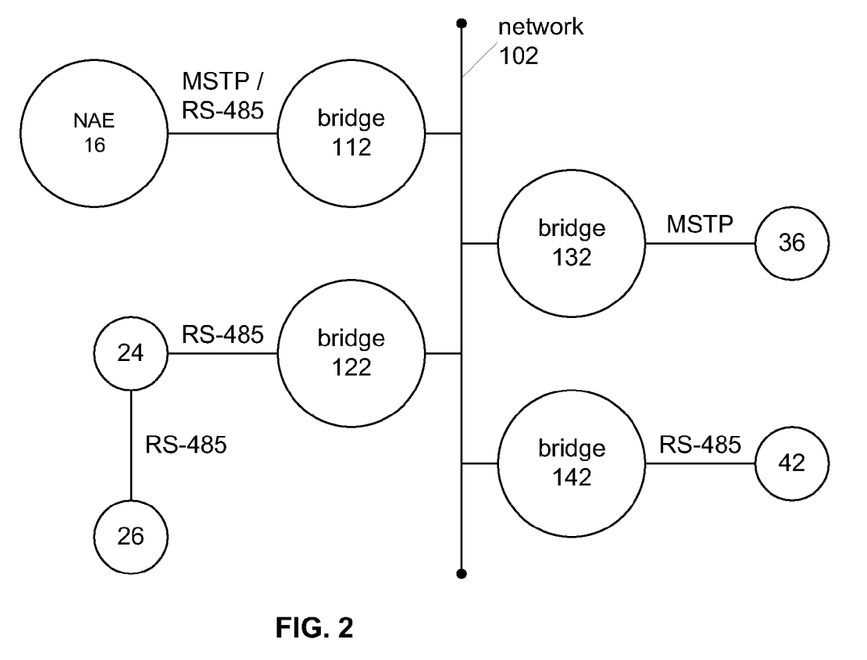
FIG. 2 is a network diagram illustrating an example system for wired bridging of communication channels according to an embodiment of the present invention.

FIG. 2 is a network diagram illustrating an example system for wired bridging of communication channels according to an embodiment of the present invention. In the illustrated embodiment, four bridge devices 112, 122, 132, and 142 are communicatively coupled over a wired network, namely network 102. In alternative embodiments, different network types may be employed for the network 102. For example, in one embodiment, the wired network 102 may be Ethernet. The bridge devices are each in communication with their respective network devices including network automation engine ("NAE") 16, and other network devices 24, 26, 36, and 42. The other network devices can be any variety of network devices. The communication channels between the bridge devices and the various network devices can be direct wired physical connections and include BACnet/MSTP, raw RS-485, BACnet/PTP, raw RS-232, and the like. These communication channels can also be direct wireless connections over a wireless physical medium.

Figure 3:
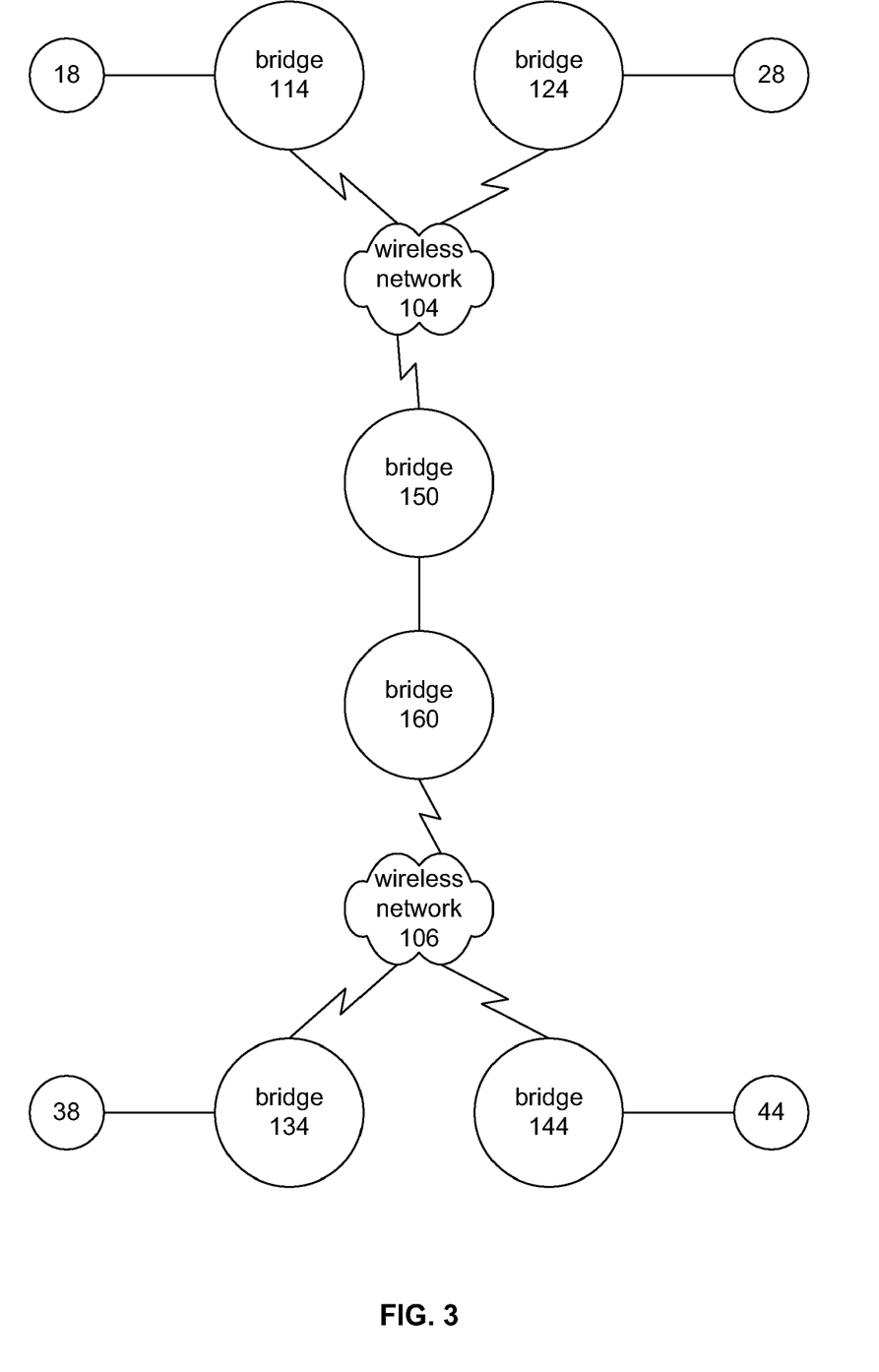
FIG. 3 is a network diagram illustrating an example system for combined wired and wireless bridging of communication channels according to an embodiment of the present invention.

FIG. 3 is a network diagram illustrating an example system for combined wired and wireless bridging of communication channels according to an embodiment of the present invention. In the illustrated embodiment, bridges 114, 124, 134, and 144 are communicatively coupled via wireless network 104, bridge 150, bridge 160, and wireless network 106. As will be understood by those having skill in the art, alternative network configurations may also be employed to bridge geographically disjoint communication channel segments. For example, bridge 114 may be in Seattle and bridge 144 may be in San Diego and wireless network 104 may include the Internet, a cellular GPRS network or other wide-area network as well as local area networks.

Accordingly, the latency times for network communications even on a dedicated wire segment may be too great for implementation of a single BACnet network across that distance. Advantageously, the present invention can bridge the geographically disjoint segments and connect network device 18 and network device 44 as if they were on the same physical wire. This can be achieved through the proxy technique such that the network latency requirements are met via proxy responses from a bridge device, coupled with reliable communications over wireless networks 104 and 106 in order to meet the overall round trip time for communication as required by the protocol.

The various networks described in FIGS. 1-3 can be any of a variety of network types and topologies and any combination of such types and topologies. For example, the networks can be a wired network, a wireless network or any combination of these. For example, in one or more embodiments, a network can be any of a plurality of networks including private, public, circuit switched, packet switched, personal area networks ("PAN"), local area networks ("LAN"), wide area networks ("WAN"), metropolitan area networks ("MAN"), 802.11, 802.15, 802.16, WiFi networks, WiMAX networks or any combination of these. In one or more embodiments, a network may include the particular combination of networks ubiquitously known as the Internet.

Figure 4:
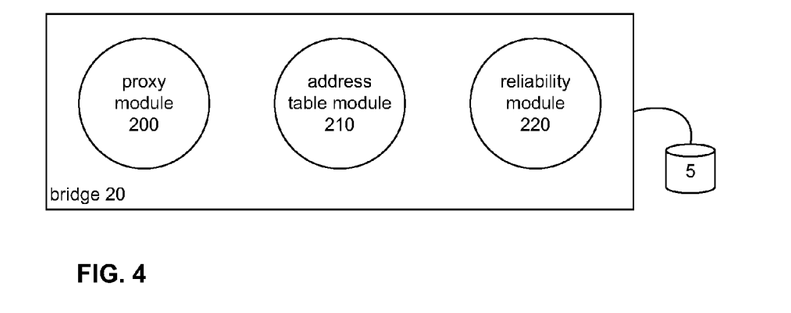
FIG. 4 is a block diagram illustrating an example bridge device according to an embodiment of the present invention.

FIG. 4 is a block diagram illustrating an example bridge device 20 according to an embodiment of the present invention. In the illustrated embodiment, the bridge device 20 is configured with a data storage area 5 and comprises proxy module 200, address table module 210, and reliability module 220.

The data storage area 5 can be any sort of internal or external, fixed or removable memory device and may include both persistent and volatile memories. The function of the data storage area 5 is to maintain data or executable modules for long term storage and also to provide efficient and fast access to instructions for applications or modules that are executed by the bridge device 20.

In one embodiment, the proxy module 200 is configured to send responses to network devices on behalf of other network devices on other communication channel segments. For example, the proxy module 200 may send a response to a network device that sends a PFM communication. This way, the network device sending the PFM communication receives a response indicating that the target device received the communication (even though the target device may not have yet received the communication). This prevents the sending device from timing out the communication and maintains the integrity of the communications with respect to latency compliance.

The address table module 210 is configured to manage an address table and update and maintain the entries in the address table. In one embodiment, the address table module 210 adds entries to the address table when it encounters a new MAC address on its local segment. The address table module 210 also removes entries from the table if no communications from the particular device with the MAC address have been received for a period of time. Advantageously, this timeout period can be configurable. Advantageously, it can also remove the device under explicitly defined circumstances under which a device that should exist would exhibit a certain behavior; for example, once a token is passed to a device in a BACnet/MSTP network, it should use the token within 500 ms. The address table module 210 also adds entries to the table when it receives new entries from a bridge device. Advantageously, the address table module 210 can have a mechanism to synchronize its entries with other bridge devices, so that all bridge devices' address table modules have the same contents. This way, the address table for each bridge includes an entry for the network devices on the local segment as well as the network devices on the remote segments being monitored by other bridge devices.

The reliability module 220 is configured to maintain reliable communications on the local segment by ensuring that proxy responses are sent prior to any timeout conditions. The reliability module 220 is configured to spoof network devices by providing certain timely responses to communications, thereby allowing communications to continue under the total round trip latency timeout metrics rather than the total round trip timeouts in combination with acknowledgment timeouts. The reliability module 220 is advantageously configured to provide proxy responses for any sort of communication that may be sent by a network device that requires a timely interim response in advance of the complete data communications. Examples of these types of communications may include but are not limited to Indications, Requests and token passing communications in a BACnet/MSTP network.

Figures 5, 6, 7:
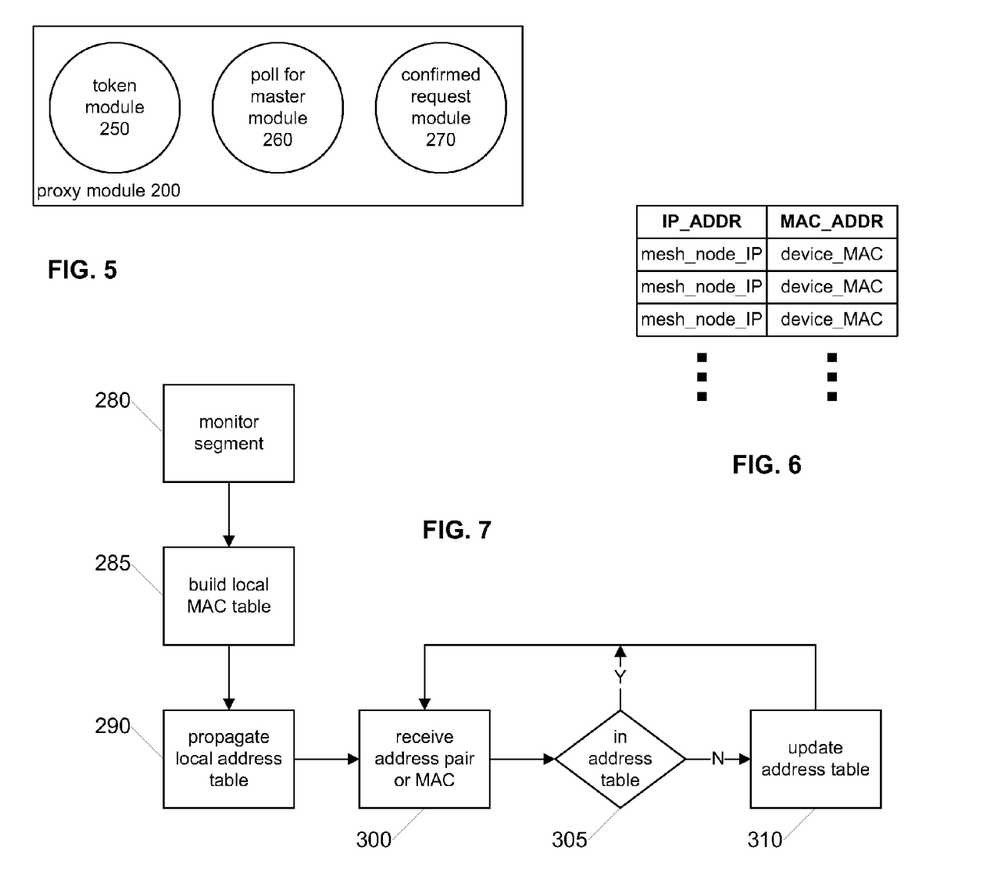
FIG. 5 is a block diagram illustrating an example proxy module according to an embodiment of the present invention.
FIG. 6 is a block diagram illustrating an example address table according to an embodiment of the present invention.
FIG. 7 is a flow diagram illustrating an example process for propagating address tables to a plurality of wireless bridges according to an embodiment of the present invention.

FIG. 5 is a block diagram illustrating an example proxy module 200 according to an embodiment of the present invention. In the illustrated embodiment, the proxy module 200 comprises a token module 250, a PFM module 260, and a confirmed request module 270. The token module 250 is configured to manage communications regarding token passing and generate appropriate proxy responses for a remote network device that is the target device for a token passing communication. The PFM module 260 is configured to manage communications regarding PFM requests and generate appropriate proxy responses for a remote network device that is the master at the time the PFM communication is sent. The confirmed request module 270 is configured to manage communications regarding BACnet Data Expecting Reply requests, generate the appropriate proxy messages on the sending and receiving end, and forward the responses at an appropriate time.

As will be understood by one having skill in the art, these message types, namely token, PFM, and BACnet data expecting reply, are specific MAC layer messages designed to prevent collisions on a network that uses a token-passing regime (versus collision detection/random backoff as in Ethernet, or timeslots as in time division multiple access, etc). Accordingly, it should also be understood that the same techniques can be applied to implement these aspects of the invention in other embodiments using, for example, BACnet/IP and other protocols.

FIG. 6 is a block diagram illustrating an example address table according to an embodiment of the present invention. In the illustrated embodiment, the address table comprises a plurality of entries, with each entry having an internet protocol ("IP") address and an associated MAC address. Advantageously, the table will also identify the type of entry; e.g. if it is a master or a slave node. The MAC address is the MAC address of a network device on a segment of the communication channel and the associated IP address is the IP address for the bridge device. Advantageously, address tables are shared by the bridges in a system so that each bridge has the MAC address of each network device on the various segments that make up the system and an associated IP address of the bridge device that is the proxy for that network device on the mesh network. This address table is substantially different from conventional address tables where IP addresses and MAC addresses for the same device are paired in each entry.

FIG. 7 is a flow diagram illustrating an example process for propagating MAC addresses to a plurality of wireless bridges according to an embodiment of the present invention. This process may be carried out by a series of bridge devices in a system such as that previously described with respect to FIGS. 1-3. Initially, in step 280 the bridge monitors its segment for data packets that identify the sending network device on the segment. Various packets are examined by the bridge and the various MAC addresses for the network devices on the local segment are added to the address table, as shown in step 285. Next, in step 290 the bridge sends its list of MAC addresses out on the wireless bridge, for example in a control channel. The other bridges in the network do the same.

In step 300, the bridge receives an address pair or a MAC address. For example, an address pair is received by the bridge over the network and is sent by a bridge device that couples the local MAC address from its segment with its own IP address. Additionally, the bridge may receive a MAC address from a packet on its local segment. Once received, in step 305 the bridge determines if the MAC address or the IP address and MAC address pair are in its address table. Advantageously, it determines the type of device based on the class of message received. If the MAC address or address pair is present, then the process loops back to receiving the next address pair or MAC address. If the MAC address or address pair are not in the address table, then in step 310 the bridge adds the entry to its table. Although not shown, if the bridge adds a new local segment MAC address to its table, then it loops back to step 290 where the pair of the new local segment MAC address and the IP address for the bridge are propagated out over the network to the other bridge devices in the system.

Figure 8:
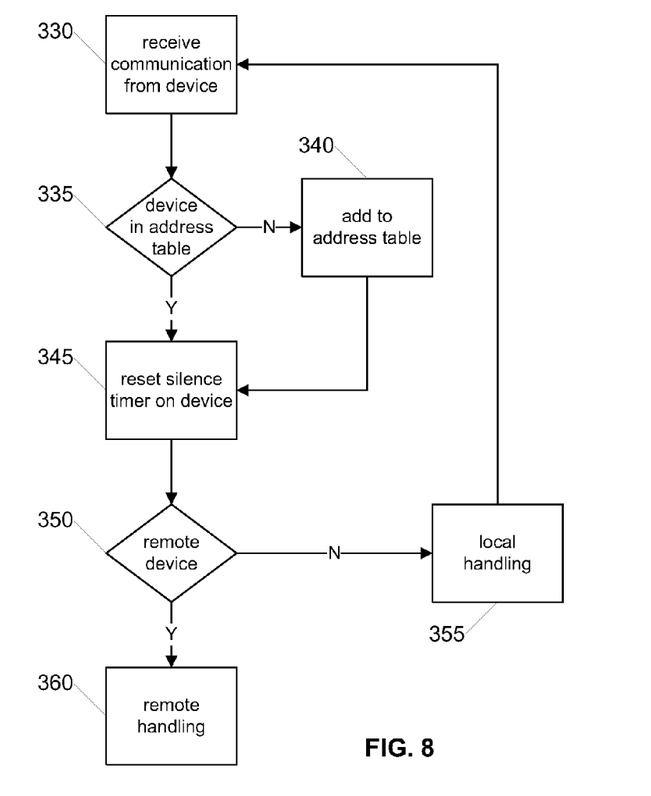
FIG. 8 is a flow diagram illustrating an example process for handling local communication channel communications according to an embodiment of the present invention.

FIG. 8 is a flow diagram illustrating an example process for handling local segment communications according to an embodiment of the present invention. This process may be carried out by a bridge device in a system such as that previously described with respect to FIGS. 1-3. Initially, in step 330 the bridge receives a communication from a network device on its local segment. The bridge determines in step 335 if the network device is present in its address table. If it is not, then the MAC address for the network device is added to the table in step 340 (and the pair is propagated as previously described). If it is in the table then in step 345 the bridge resets a silence timer for the network device that tracks the presence of the device on the local segment of the bridge. Notably, devices that time out on a local segment are removed from the address table.

Next, in step 350 the bridge determines whether the received communication is destined for a remote device that is accessible via the wireless bridge. If the communication is not destined outside of the local segment, then in step 355 the bridge drops the communication as it will be received by the target device via the local segment unless it is necessary to copy the message elsewhere to prevent remote silence timers from expiring. If, as determined in step 350 the communication is destined for a network device via the wireless bridge, then the bridge processes the communication according to a remote handling procedure. If the communication is destined for an unknown network device, the message is treated as a broadcast and sent to all segments.

Figure 9:
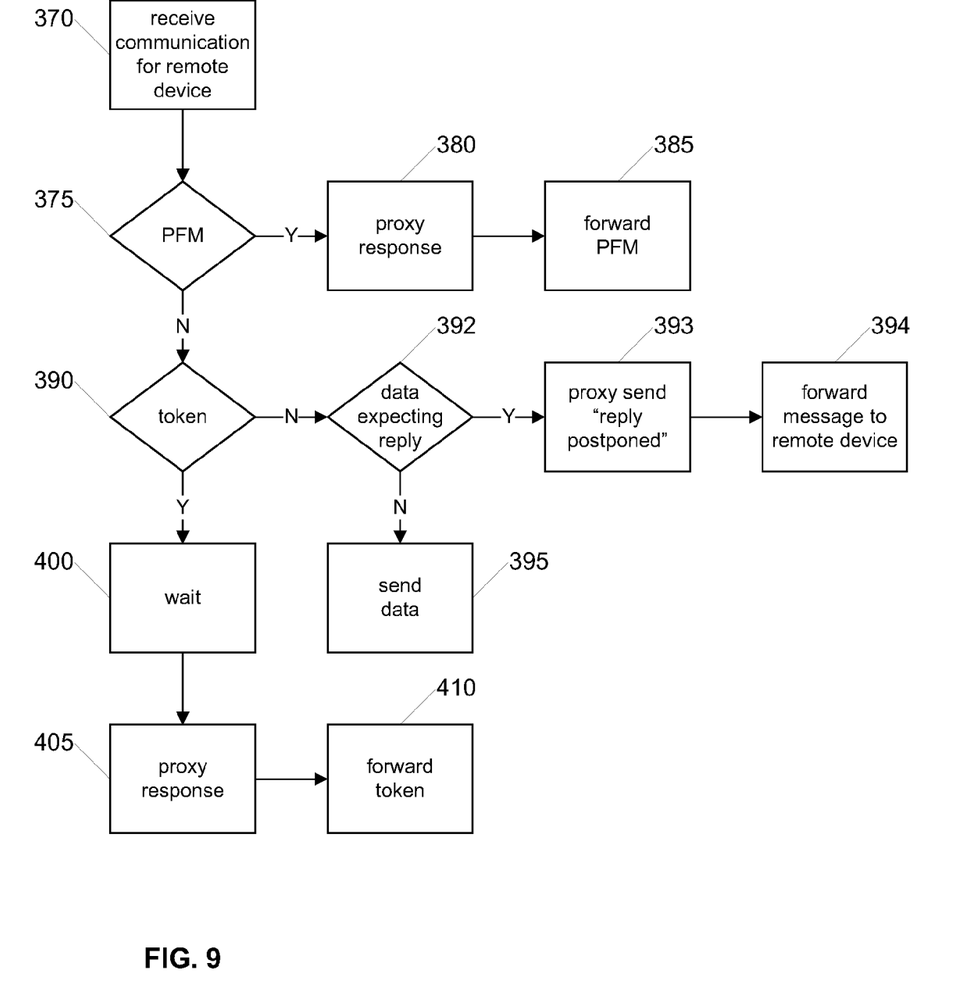
FIG. 9 is a flow diagram illustrating an example process for handling remote communication channels communications according to an embodiment of the present invention.

FIG. 9 is a flow diagram illustrating an example process for handling remote segment communications according to an embodiment of the present invention. This process may be carried out by a bridge device in a system such as that previously described with respect to FIGS. 1-3. Initially, in step 370 the bridge receives a communication that is destined for a remote network device that is accessible via the wireless bridge. Next, in step 375 the bridge examines the communication to determine if it is a Poll For Master. If the communication is a Poll For Master, then in step 380 the bridge timely sends a proxy response to the sending network device and forwards the PFM communication to the target device via the wireless bridge. In one embodiment, any responsive communication to the PFM request from the target device can be filtered by the bridge so that the proxy response is not duplicated. This filtering can be done in all cases where a proxy response is sent by a bridge.

If the communication is not a PFM request, as determined in step 375, then in step 390 the bridge examines the communication to determine if it is a token passing communication. If the communication is a token passing communication, then in step 400 the bridge waits for a predetermined period of time (defined by Turnaround) and then in step 405 sends a proxy response to the sending network device. In step 410, if the bridge is configured to support one token for the whole network (the "hub" model), it forwards the token to the destination; if the bridge is configured to support one token for each segment attached to a bridge device (the "switch" model), the bridge simulates the behavior of remote devices, including passing along any forwarded communication for each remote device.

If it is not a token passing communication, then the bridge examines the communication to determine if it is BACnet Data Expecting Reply as show in step 392. If so, it sends a proxy response in the form of a Reply Postponed message on behalf of the remote device in step 393, then forwards the message along to the remote device in step 394. In all other cases, the bridge sends the data communication along to the target network device via the wireless bridge, as shown in step 395.

Figure 10:
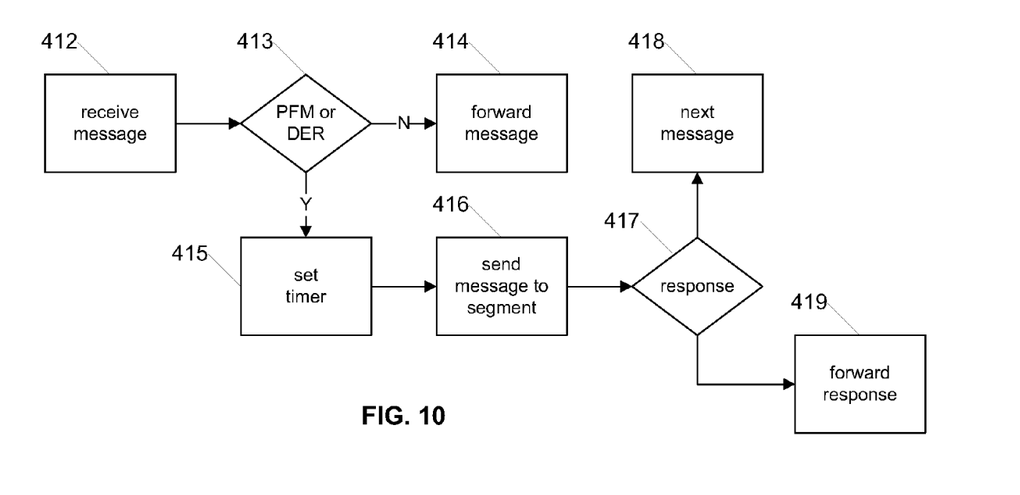
FIG. 10 is a flow diagram illustrating an example process for handling remote segment communications according to an embodiment of the present invention.

FIG. 10 is a flow diagram illustrating an example process for handling remote segment communications according to an embodiment of the present invention. This process may be carried out by a bridge device in a system such as that previously described with respect to FIGS. 1-3. In step 412, the bridge receives a message from a remote device. In step 413, the bridge determines if the message is a Poll For Master or BACnet Data Expecting Reply ("DER") request. If neither, the bridge forwards the message in step 414 and does nothing else. If the message is either a PFM or BACnet DER request, in step 415 a timer is set to the appropriate value (e.g., Tusage_timeout for PFM; Treply_timeout for BACnet DER).

Next, in step 416, the bridge forwards the message to the local serial segment. It then waits in step 417 for a response on the serial bus. If a response is not received on the serial segment before the timer expires, in step 418 the bridge is finished with handling the expired message and moves on to processing the next message. If a response is received on the serial segment before the timer expires, the bridge forwards the response to the requester in step 419.

Figure 11:
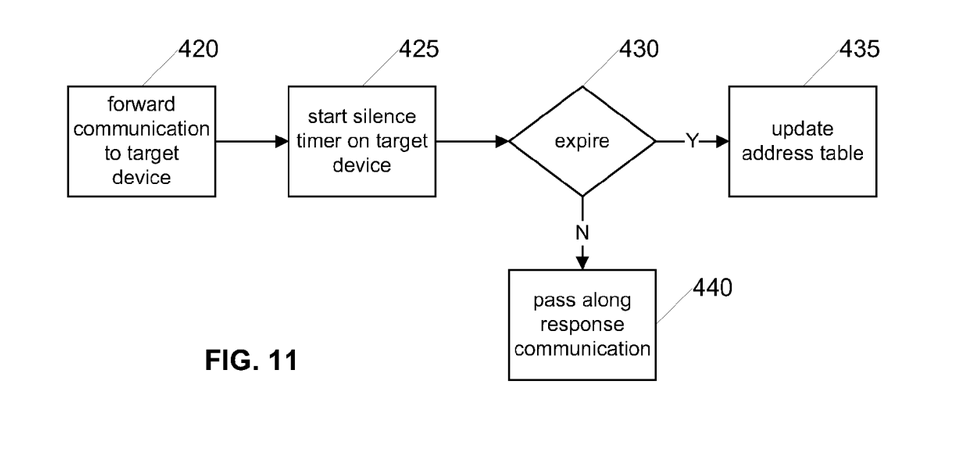
FIG. 11 is a flow diagram illustrating an example process for handling remote communication channels communications according to an embodiment of the present invention.

FIG. 11 is a flow diagram illustrating an example process for handling remote segment communications according to an embodiment of the present invention. This process may be carried out by a bridge device in a system such as that previously described with respect to FIGS. 1-3. Initially, in step 420 the bridge device forwards the communication to the target network device via the wireless bridge. Next, in step 425 the bridge starts a silence timer on the target device. Advantageously, the silence timer allows the bridge to know when a response from the target device is delinquent according to the communication protocol under which the system is operating, for example, the protocol may be BACnet with its various timeout parameters.

After the silence timer is set, the bridge waits for either a responsive communication from the target device or for the silence timer to expire. If the silence time expires, as determined in step 430, then the bridge updates its address table by removing the MAC address and its corresponding IP address for the target device. If, however, the silence timer does not expire then in step 440 the bridge passes along the responsive communication to its local segment.

Figure 12:
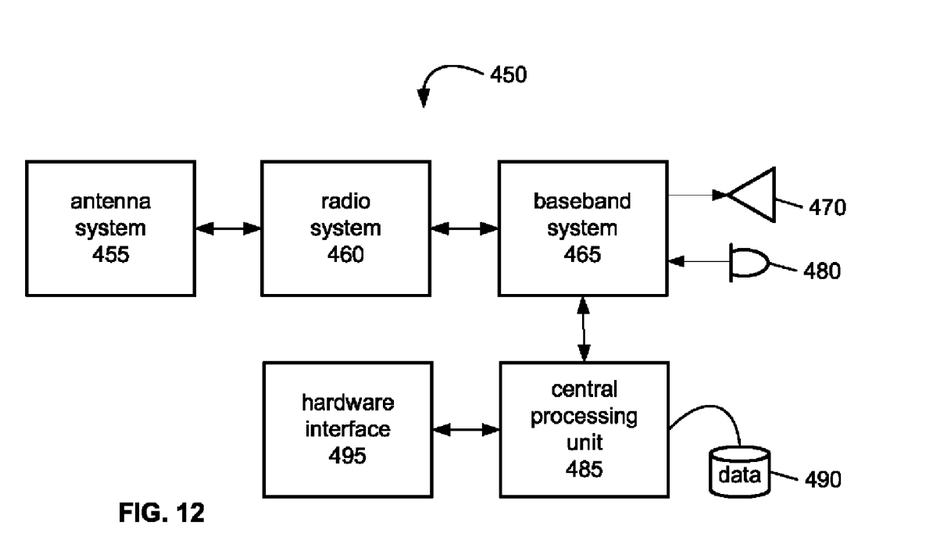
FIG. 12 is a block diagram illustrating an example wireless communication device that may be used in connection with various embodiments described herein.

FIG. 12 is a block diagram illustrating an example wireless communication device 450 that may be used in connection with various embodiments described herein. For example, the wireless communication device 450 may be used in conjunction with a bridge device or a network device as previously described with respect to FIGS. 1-3. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various modules (not shown) that were previously described with respect to FIGS. 4 and 5.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 13:
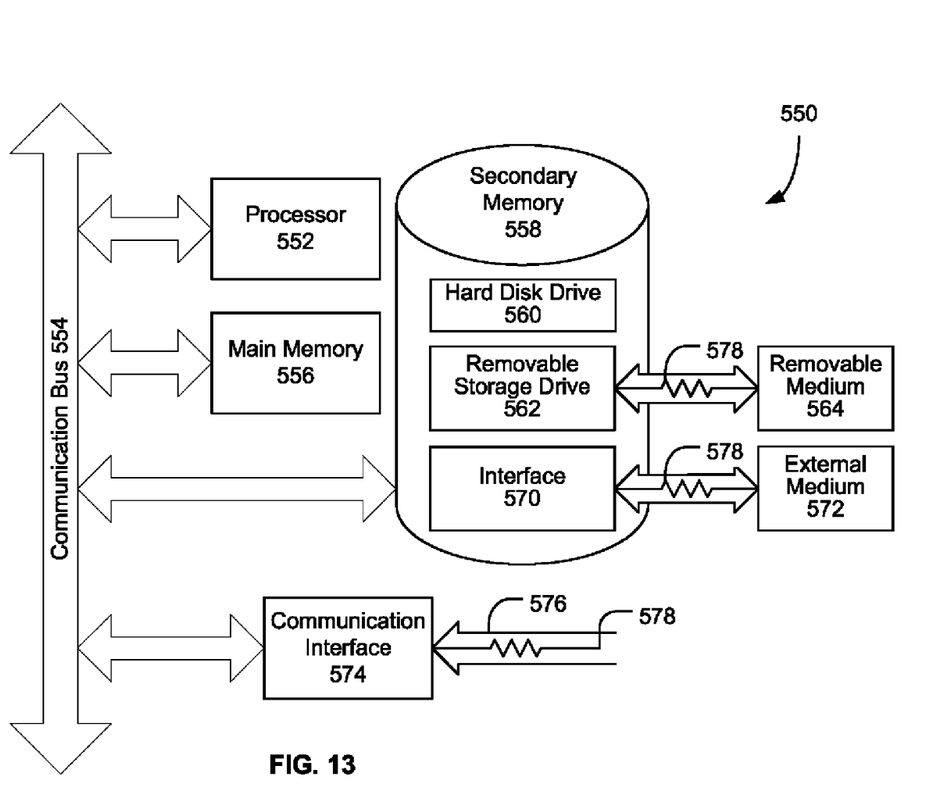
FIG. 13 is a block diagram illustrating an example computer system that may be used in connection with various embodiments described herein.

FIG. 13 is a block diagram illustrating an example computer system 550 that may be used in connection with various embodiments described herein. For example, the computer system 550 may be used in conjunction with a network device or bridge device previously described with respect to FIGS. 1-3. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A bridge device comprising:
a first communication interface communicatively coupled with one or more network devices via a respective communication channel;
a second communication interface communicatively coupled with one or more remote bridge devices via a communication network;
data storage; and
an address table stored in said data storage, the address table comprising a plurality of entries, wherein each entry comprises a first address for a network device and a second address for a remote bridge device coupled to the network device via a communication channel;
wherein the bridge device is configured to:
receive a communication from a sending network device on a first communication channel, the communication comprising a given first address for a target network device;
identify in the address table a given second address that is paired with the given first address for the target network device, wherein the given second address is for a remote bridge device coupled to the target network device via a second communication channel;
send the communication over the communication network to the remote bridge device having the given second address that is paired with the given first address in the address table; and
send a response to the sending network device to avoid a timeout occurring for the communication from the sending network device.

2. The bridge device of claim 1, wherein the communication network is a wired network.

3. The bridge device of claim 1, wherein the communication network is a wireless network.

4. The bridge device of claim 3, wherein the communication network is used for building automation and control.

5. The bridge device of claim 4, wherein the communication network implements the BACnet protocol.

6. The bridge device of claim 4, wherein the communication network implements the LonTalk protocol.

7. The bridge device of claim 1, wherein the first communication channel is a direct wired link.

8. The bridge device of claim 1, wherein the first communication channel is a direct wireless link.

9. The bridge device of claim 1, wherein the first communication channel is a network.

10. A computer implemented method for handling a communication at a bridge device, the method comprising:
receiving a communication at a bridge device on a first communication channel, the communication from a sending network device on the first communication channel and destined for a target network device on a second communication channel;
parsing the communication to obtain a first address for the target network device;
identifying in an address table a second address that corresponds to the first address for the target network device, wherein the second address identifies a remote bridge device coupled to the target network device via the second communication channel;
sending the communication to the remote bridge device via a communication network; and
sending a response from the bridge device to the sending network device to avoid a timeout occurring for the communication from the sending network device.

11. The method of claim 10, further comprising resetting a silence timer on the sending network device after receiving the communication.

12. The method of claim 10, further comprising waiting a predetermined period of time prior to sending the response from the bridge device to the sending network device.

13. The method of claim 10, wherein the communication is a token communication and the response from the bridge device to the sending network device causes the sending network device to believe that the token communication was received at the target network device.

14. The method of claim 10, wherein the communication is a data expecting reply communication and the response from the bridge device to the sending network device is a reply postponed message.

15. The method of claim 10, wherein the communication is a poll for master communication, further comprising filtering a response to the poll for master communication from the target network device.

16. A tangible computer readable medium having stored thereon, computer-executable instructions that, if executed by a computing device, cause the computing device to perform a method comprising:
receiving a communication on a first communication channel, the communication from a sending network device on the first communication channel and destined for a target network device on a second communication channel;
parsing the communication to obtain a given first address for the target network device;
identifying a given second address that corresponds to the given first address for the target network device, wherein the given second address identifies a remote bridge device coupled to the target network device via the second communication channel;
sending the communication to the remote bridge device via a communication network; and
sending a response from the bridge device to the sending network device to avoid a timeout occurring for the communication from the sending network device.

17. The tangible computer readable medium of claim 16 having stored thereon a data structure comprising:
a plurality of address pairings, wherein each address pair comprises a first address for a network device and a second address for a bridge device coupled to the network device via a communication channel.

18. The tangible computer readable medium of claim 17, wherein the first address comprises a media access control address and the second address comprises an internet protocol address.

19. A bridge device comprising:
means for receiving a communication from a sending network device on a first communication channel, wherein the communication is destined for a target network device on a second communication channel;
means for obtaining a first address for the target network device from the communication;
means for identifying in an address table a second address that corresponds to the first address for the target network device, wherein the second address identifies a remote bridge device coupled to the target network device via the second communication channel;
means for sending the communication to the remote bridge device via a communication network; and
means for sending a response to the sending network device to avoid a timeout occurring for the communication from the sending network device.

20. The bridge device of claim 19, further comprising means for resetting a silence timer on the sending network device after receiving the communication.

21. The bridge device of claim 19, further comprising means for waiting a predetermined period of time prior to sending the response to the sending network device.

22. The bridge device of claim 19, wherein the communication is a token communication and the response to the sending network device causes the sending network device to believe that the token communication was received at the target network device.

23. The bridge device of claim 19, wherein the communication is a data expecting reply communication and the response to the sending network device is a reply postponed message.

24. The bridge device of claim 19, wherein the communication is a poll for master communication, further comprising means for filtering a response to the poll for master communication from the target network device.

* * * * *

UNITED STATES PATENT AND TRADEMARK OFFICE
CERTIFICATE OF CORRECTION

PATENT NO. : 7,835,372 B2  Page 1 of 1
APPLICATION NO. : 11/421998
DATED : November 16, 2010
INVENTOR(S) : Wang et al.

It is certified that error appears in the above-identified patent and that said Letters Patent is hereby corrected as shown below:

Title page, item (76), under "Inventors", in Column 1, Line 1, delete "Searbreeze Farm" and insert -- Seabreeze Farms --.

Column 1, line 36, delete "RS485, RS232" and insert -- RS-485, RS-232 --.

Column 4, line 44, delete ""Although" and insert -- Although --.

Column 4, line 51, delete "multiple IP segments" and insert -- multiple IP segments and multiple other segments --.

Column 4, line 54, delete "types."" and insert -- types. --.

Column 8, line 32, delete "Turnaround)" and insert -- Tturnaround) --.

Signed and Sealed this
Seventeenth Day of May, 2011

David J. Kappos
*Director of the United States Patent and Trademark Office*